United States Patent [19]
Wood et al.

[11] Patent Number: 5,699,776
[45] Date of Patent: Dec. 23, 1997

[54] NOZZLE FOR MIXING OXIDIZER WITH FUEL

[75] Inventors: John M. Wood; John T. Stewart, both of Wichita Falls, Tex.

[73] Assignee: Nitrous Express, Inc., Wichita Falls, Tex.

[21] Appl. No.: 812,686

[22] Filed: Mar. 6, 1997

[51] Int. Cl.[6] .................................. F02M 23/00
[52] U.S. Cl. ...................... 123/531; 123/585; 123/1 A
[58] Field of Search ........................ 123/1 A, 585, 123/531; 239/418

[56] References Cited

U.S. PATENT DOCUMENTS

| | | |
|---|---|---|
| 4,798,190 | 1/1989 | Vaznaian et al. ............... 123/531 |
| 4,827,888 | 5/1989 | Vaznaian et al. ............... 123/531 |
| 5,269,275 | 12/1993 | Dahlgren ........................ 123/1 A |
| 5,449,120 | 9/1995 | Tani et al. ...................... 123/531 |

*Primary Examiner*—Erick R. Solis
*Attorney, Agent, or Firm*—Jerry C. Ray

[57] ABSTRACT

A nitrous oxide nozzle for inserting a mixture of oxidizer and fuel into a passage of an engine's intake manifold has two inlet ports, each of which communicate with a conduit. A nitrous oxide conduit vents into the apex of a bell-shaped emitter, and a fuel conduit vents into a side portion of an atomizing cavity adjacent the emitter, so that high-pressure nitrous oxide gas flowing through the emitter entrains fuel flowing through the fuel conduit, then atomizes the fuel and mixes with the fuel. The bell shape of the emitter provides improved mixing of fuel with the nitrous oxide; the discharged fuel/oxidizer mixture from the emitter is introduced into air flowing through an engine's intake manifold, and is conveyed to a cylinder for burning.

8 Claims, 2 Drawing Sheets

( VIEW 1-1 )

NOZZLE FOR MIXING OXIDIZER WITH FUEL

CROSS REFERENCE TO RELATED APPLICATIONS

None

BACKGROUND OF THE INVENTION

1. Field of the Invention

This invention relates to nozzles for introducing a mixture of an oxidizer such as gaseous nitrous oxide ($N_2O$) and fuel into an intake manifold of an internal combustion engine, and in particular to such nozzles having an $N_2O$ conduit venting into a bell-shaped emitter and a fuel conduit venting into an adjacent atomizing cavity where $N_2O$ and fuel are mixed.

2. Description of the Related Art

Racing vehicles add an oxidizer such as nitrous oxide to their fuel to boost their horsepower. Fuel and oxidizer must be well mixed and effectively delivered to the engine to obtain maximum performance. The problem addressed by the present invention is that of thorough mixing of oxidizer and fuel, and efficiently introducing the gaseous mix into the air flow entering the engine's cylinders.

U.S. Pat. Nos. 4,798,190 and 4,827,888 disclose $N_2O$ nozzles having concentric fuel and $N_2O$ conduits. Each conduit in this type of nozzle assembly exits into a V-shaped notch cut across the width of the nozzle body. Because the fuel and $N_2O$ can spread laterally and exit the sides of the V-shaped notch as well as the wide mouth of the notch, the two components are not mixed as thoroughly as possible.

SUMMARY OF THE INVENTION

The invention is a nozzle having means for thoroughly mixing fuel and an oxidizer; the nozzle has a threaded shoulder for installation in an intake manifold of an internal-combustion engine. Two channels or conduits inside a body of the nozzle assembly conduct liquid fuel and gaseous oxidizer to an emitter at an end of the body. The oxidizer is fed, under high pressure, into the apex of a bell-shaped emitter. Adjacent the larger open end of the emitter is an atomizing cavity; oxidizer flows from the emitter, through the atomizing cavity. Fuel is introduced into a side of the atomizing cavity, and liquid fuel is entrained in the high-velocity flow of the oxidizer, and broken up into droplets. The cloud of mixed fuel and atomizer from the emitter is carried by the airflow moving through an intake manifold passageway to a cylinder, where it is burned. Differences between the present invention and previous oxidizer nozzles may be seen by comparing the prior art nozzle of FIG. 6 with the detailed description given below.

OBJECTS OF THIS INVENTION

It is an object of this invention to increase the horsepower of fuel-burning engines by providing a nozzle assembly that will thoroughly mix liquid fuel with a gaseous oxidizer such as nitrous oxide.

It is a further object of this invention to provide a nozzle assembly that will more efficiently introduce a fuel/oxidizer mixture into an engine's intake manifold.

Further objects are to achieve the above with devices that are sturdy, compact, durable, lightweight, simple, safe, efficient, and reliable, yet easy to manufacture, install, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
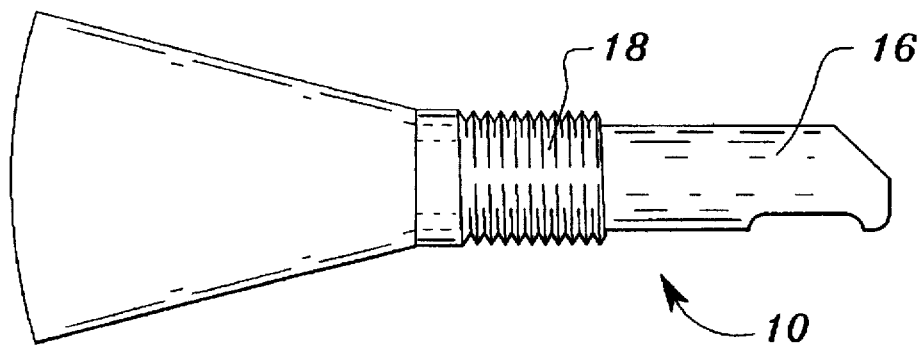
FIG. 1 is a side elevation of the nozzle.

To aid in the correlation of the elements of the invention to the exemplary drawings, the following catalog of the elements is provided:

10 nozzle
12 inlet port
14 fitting for supply line
16 nozzle body
18 threaded shoulder
20 nitrous oxide conduit
22 fuel conduit
24 emitter
26 atomizing cavity

Figure 2:
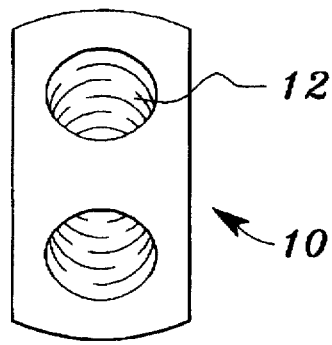
FIG. 2 is an end elevation of the inlet end of the nozzle.

DESCRIPTION OF THE PREFERRED EMBODIMENTS:

Referring to the drawings, FIG. 1 shows a nitrous oxide nozzle 10. Nozzle 10 has two inlet ports 12, as shown in FIG. 2. A first inlet is for gaseous nitrous oxide, and a second inlet for liquid fuel such as gasoline or methanol. Nitrous oxide is sometimes referred to herein as "oxidizer" or by its chemical symbol, $N_2O$.

Figure 3:
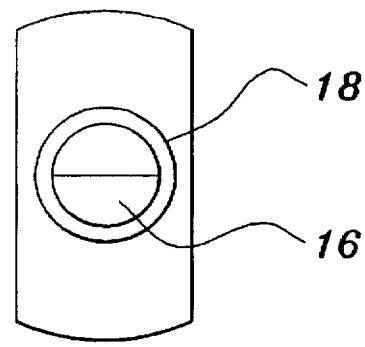
FIG. 3 is an end elevation of the emitter end of the nozzle.
Figure 5:
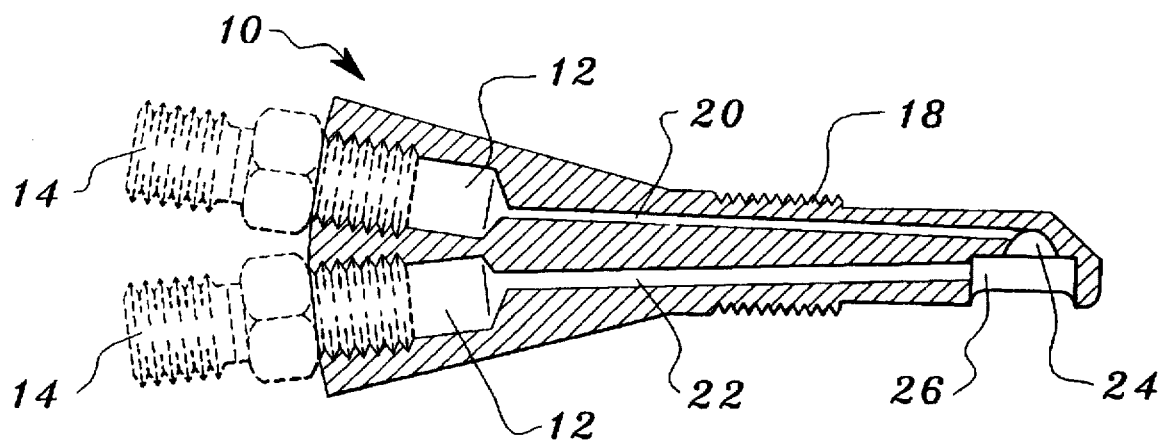
FIG. 5 is a cross section along view 1—1 of FIG. 1.
Figure 6:
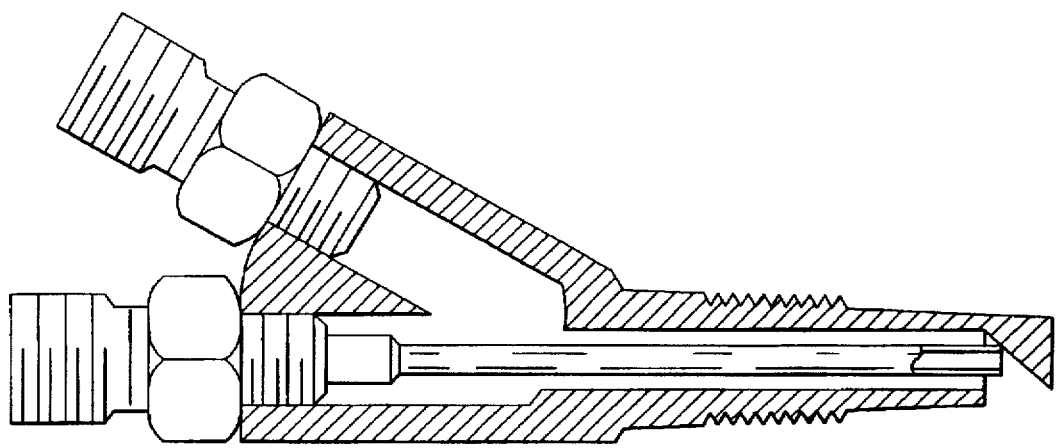
FIG. 6 is a cross section of a prior art design.

In a high-performance vehicle, fuel such as gasoline is carried in an on-board tank. One or more fuel pumps furnish fuel via a supply line to the nozzle 10. Nitrous oxide is carried within a pressurized tank, and is fed to the nozzle at a pressure in the range of 900–1,050 psi. Supply-line fittings 14, shown in FIG. 5, are used to connect fuel and oxidizer lines to nozzle 10. FIG. 3 is an end view of the nozzle, showing the preferred configuration of nozzle body 16, threaded shoulder 18, and the flared inlet end of the nozzle.

Referring again to FIG. 5, the nozzle 10 includes one conduit 20 for $N_2O$, and a separate, second conduit 22 for fuel. In one embodiment of the invention, each conduit has a diameter of 0.073". Parallel to each other or substantially so, the conduits extend the length of the nozzle assembly. Each conduit communicates with an inlet port 12; i.e., one inlet port for fuel, one for nitrous oxide.

Figure 4:
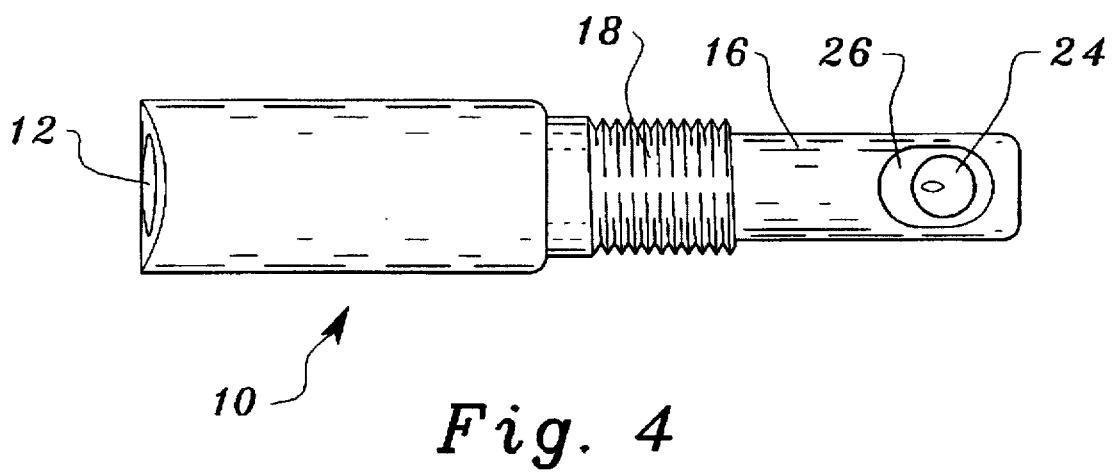
FIG. 4 is a bottom plan view of the nozzle.

Referring to FIG. 4 and FIG. 5, a distal end of the nozzle body 16 includes a bell-shaped emitter 24 which is an outlet for the gaseous $N_2O$. The axis of symmetry of the emitter 24 is at 90° to the length of the nozzle body; i.e., the emitter exhausts sideways relative to the nozzle body. A range of maximum curvature for the interior surface of the emitter is 50° to 56°, with an optimal curvature being 53°. The 53° curvature of the emitter provides the best combination of gas velocity and efficient fuel mixing, as described below.

The $N_2O$ conduit 20 is drilled so as to communicate with and vent into an apex of the bell-shaped emitter 24. $N_2O$ is introduced at high pressure (900–1,050 psi) through the conduit 22 into the apex of the emitter 24. On entering the emitter, the nitrous oxide immediately begins to expand and flow toward the larger outlet end of the emitter. The bell-like configuration of the emitter 24 allows the nitrous oxide gas to expand somewhat but keeps the gas confined so that its velocity remains high.

Referring again to FIG. 4 and FIG. 5, the exhaust end of the emitter 24 opens into an atomizing cavity 26 which is machined into the nozzle body 16. Preferred dimensions of the atomizing cavity 26 are about 0.375 " long by 0.220 " wide by 0.080 " deep; the long axis of the atomizing cavity is parallel to the long axis of the nozzle body.

An outlet end of the fuel conduit 22 vents through the wall of atomizing cavity 26. The high-velocity flow of the $N_2O$ from the emitter and through the atomizing cavity caused a decrease in pressure in the zone adjacent the flow; the reduced pressure pulls the liquid fuel from the end of the fuel conduit into the oxidizer stream. As the fuel is entrained in the oxidizer flow, fuel is atomized or broken into droplets. Mixing of fuel and oxidizer occurs within the atomizing cavity 26 and continues in a zone outside of and adjacent to the atomizing cavity. Turbulence in the flow ensures that the atomized fuel mixes thoroughly with the oxidizer, so that a homogeneous mist of fuel and oxidizer is produced by the nozzle.

In use, the nozzle 10 is installed in a threaded opening in the wall of a passage (called a "runner") in an intake manifold of an engine; the nozzle has a threaded shoulder 18 to mate with female threads in the opening. The intake manifold has one passage or runner per cylinder. A separate nozzle is used for each runner, so that each cylinder has its own supply of fuel/oxidizer vapor being metered through the nozzle directly into the runner for that particular cylinder.

The length of the nozzle body 16 is critical to proper introduction of the fuel/oxidizer mixture into the runner. Earlier versions of $N_2O$ nozzles extended only slightly into the runner. Experiment has shown, that maximum performance occurred when the body of the nozzle assembly extended further into the runner, so that the emitter is near the centerline of the runner. The body of the present nozzle extends into the runner a predetermined distance so that the emitter is at or near the centerline of the runner. Thus the mixture of fuel and oxidizer is more efficiently mixed with air flowing through the runner, and each cylinder receives and burns a well-mixed charge of fuel, air, and oxidizer. In one embodiment for use on an intake manifold for a 454 cubic inch engine, the nozzle 10 measures 2.050" from its inlet end (not including supply-line fittings) to a center of the emitter, and 2.200" overall. Other embodiments, for use on other engines such as motorcycle engines, require different lengths to place the emitter near the center of the intake runner.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

We claim:

1. In a nitrous oxide supply system of a type having a nozzle for introducing a mixture of fuel and oxidizer into an intake manifold of an internal-combustion engine, said nozzle including two inlet ports, and a body with a fuel conduit and a nitrous oxide conduit, wherein the improvement comprises:

said nozzle body having a bell-shaped emitter proximate an end of said body, said nitrous oxide conduit having an outlet communicating with an apex of said bell-shaped emitter, an atomizing cavity adjacent an outlet of said emitter, said fuel conduit having an outlet communicating with a side portion of said atomizing cavity, whereby said fuel is entrained by and mixed with a flow of nitrous oxide as the nitrous oxide flows from said bell-shaped emitter through said atomizing cavity.

2. The invention as described in claim 1, further comprising:

an interior surface of said bell-shaped emitter having a maximum angle relative to an axis of said emitter within a range of 50° to 56°.

3. The invention as described in claim 1, further comprising:

said nozzle having a body of a predetermined length so that an emitter at an end of said body is disposed proximate an axial center of the passage of an intake manifold.

4. The invention as described in claim 3, wherein said predetermined length is 2,050 inch from an inlet end of said body to a center of said emitter.

5. The invention as described in claim 1, wherein said atomizing cavity has a long axis and a short axis, said long axis being parallel to a long axis of said nozzle body.

6. The invention as described in claim 1, wherein a diameter of said fuel conduit and said oxidizer conduit is 0.073 inch.

7. A method of mixing nitrous oxide with fuel for introduction via a nozzle into an intake manifold of an internal-combustion engine, said nozzle having a body including two inlet ports, a fuel conduit and a nitrous oxide conduit, comprising the following steps:

introducing nitrous oxide into said nitrous oxide conduit, passing the nitrous oxide through said nitrous oxide conduit to an apex of said bell-shaped emitter, venting the nitrous oxide through said bell-shaped emitter, passing the nitrous oxide through an atomizing cavity adjacent an outlet of said emitter, and introducing fuel into said atomizing cavity via a fuel conduit having a vent communicating with a side portion of said atomizing cavity, whereby said fuel is entrained by and mixed with a flow of nitrous oxide as the nitrous oxide flows through said atomizing cavity.

8. The method as described in claim 7, wherein the step of introducing nitrous oxide into said nozzle includes said nitrous oxide being at a pressure within a range of 900 psi to 1,050 psi.

* * * * *